US007011247B2

(12) United States Patent
Drabczuk et al.

(10) Patent No.: US 7,011,247 B2
(45) Date of Patent: Mar. 14, 2006

(54) METHOD OF COMMUNICATION BETWEEN A SMART CARD AND A HOST STATION

(75) Inventors: Nicolas Drabczuk, Fresnes (FR); Matthias Gelze, Paris (FR)

(73) Assignee: Axalto SA, Montrouge (FR)

( * ) Notice: Subject to any disclaimer, the term of this patent is extended or adjusted under 35 U.S.C. 154(b) by 29 days.

(21) Appl. No.: 10/221,456

(22) PCT Filed: Mar. 15, 2001

(86) PCT No.: PCT/IB01/00380

§ 371 (c)(1), (2), (4) Date: Sep. 12, 2002

(87) PCT Pub. No.: WO01/69881

PCT Pub. Date: Sep. 20, 2001

(65) Prior Publication Data

US 2003/0093609 A1 May 15, 2003

(30) Foreign Application Priority Data

Mar. 15, 2000 (FR) .................................. 00/03498

(51) Int. Cl.
*G06K 7/08* (2006.01)

(52) U.S. Cl. ...................................... 235/451; 235/441

(58) Field of Classification Search ................ 235/451, 235/380, 441, 487, 492
See application file for complete search history.

(56) References Cited

U.S. PATENT DOCUMENTS

| | | | | |
|---|---|---|---|---|
| 5,438,359 | A * | 8/1995 | Aoki | 348/231.9 |
| 5,767,844 | A * | 6/1998 | Stoye | 364/189 |
| 5,889,272 | A * | 3/1999 | Lafon et al. | 235/380 |
| 6,145,035 | A * | 11/2000 | Mai et al. | 235/382 |
| 6,151,647 | A * | 11/2000 | Sarat | 710/103 |
| 6,343,364 | B1 * | 1/2002 | Leydier et al. | 713/500 |
| 6,439,464 | B1 * | 8/2002 | Fruhauf et al. | 235/492 |
| 6,457,647 | B1 * | 10/2002 | Kurihashi et al. | 235/486 |
| 6,763,399 | B1 | 7/2004 | Margalit et al. | |

FOREIGN PATENT DOCUMENTS

| | | | |
|---|---|---|---|
| JP | 404205079 | * | 7/1992 |

* cited by examiner

*Primary Examiner*—Daniel Stcyr
(74) *Attorney, Agent, or Firm*—Pehr Jansson

(57) ABSTRACT

A card-like portable article having a microcontroller comprises a memory that contains a set of instructions allowing the microcontroller to communicate in accordance with a first communication protocol. The card-like portable article further comprises an interface for converting commands in accordance with the first communication protocol into commands in accordance with a second communication protocol and vice versa. Preferably, the first communication protocol is in conformity with the ISO 7816-3 standard and the second communication protocol is in conformity with the USB standard.

5 Claims, 6 Drawing Sheets

METHOD OF COMMUNICATION BETWEEN A SMART CARD AND A HOST STATION

This application is a continuation of international application of a 371 of PCT/IB01/00380 filed Mar. 15, 2001 and claims priority under 35 U.S.C. 119 of French application 2000 03498 filed Mar. 15, 2000.

FIELD OF THE INVENTION

The invention relates to a card-like portable article having a microcontroller. The invention further relates to a connector having a slot for receiving such a card-like portable article.

BACKGROUND OF THE INVENTION

Smart cards are standardized portable articles defined in ISO standard 7816, and they can be used in particular to provide secure management of confidential data and to provide identification. In order to communicate with the outside world, these cards generally make use of the communications protocols defined in the third and fourth parts of the above-mentioned standard. In particular, these involve a protocol that is well known to the person skilled in the art under the reference T=0, which implements commands of a defined format: application protocol data unit (APDU) commands.

The universal serial bus (USB) standard describes a universal serial bus system and has been developed to make it possible for data interchanges between a host station, e.g. a workstation constituted by a personal computer, and any peripheral device, e.g. a printer or a keyboard, to be managed in a manner that is both simple and fast. The use of that system represents numerous advantages. Firstly, it requires two conducive lines $V_{BUS}$ and GND to power the peripheral device and two conductive lines D+ and D− for differential transmission of data signals. Secondly, it enables data to be transmitted at speeds that are generally higher than those proposed by the serial links conventionally installed on personal computers. These speeds are 12 megabits per second (Mb/s) at full speed and 1.5 Mb/s at low speed. Furthermore, it is compatible with hot "Plug & Play" of peripherals, i.e. it is compatible with the host computer recognizing such peripherals on a dynamic basis. By means of such recognition, the peripheral driver programs which reside in a mass memory of the host computer are loaded into a read/write memory of said computer only when said peripherals are connected. The same drivers are unloaded from said read/write memory when the peripherals are disconnected. In addition, the universal serial bus enables up to 126 peripherals to be connected in cascade on a single physical USB port. Finally, USB peripherals do not monopolize a hardware interrupt request (IRQ) managed by the components of the computer.

Nowadays, the need to make access to host stations secure and likewise access to servers associated with said stations is becoming increasingly important. The same applies to the need to make secure the transfer of data under the control of such stations, in particular from applications software in said stations dedicated specifically to email or to browsing the Internet, where it is desirable for data to be authenticated by means of encryption algorithms that make it possible to certify said data and to sign it.

Given the state of the art as set out above, the above-mentioned security needs have naturally been met by making use of smart cards that operate using the protocols set out in the third and fourth parts of ISO standard 7816, via special smart card readers that are connected to the USB ports of a host computer and that implement USB/ISO protocol conversion. Such readers communicate firstly with the host computer using the USB system and secondly with the card using the ISO system.

Unfortunately, such readers are very expensive. They need to have means for generating a clock for driving the operation of a central processor unit (CPU) in the microcontroller of the card via the clock (CLK) contact area of the card. They also need to have means for generating a reset signal and for transmitting said signal to the card via a specific contact area known as the reset (RST) area.

Furthermore, when the card is a pure ISO card, the procedures for communicating with the card do not have the above-mentioned advantages of the USB system relating in particular to a small number of conductive lines and to high data rates.

SUMMARY OF THE INVENTION

It is an object of the invention to reduce cost.

In a first aspect, the invention provides a method of communication between a host station such as a personal computer and a portable article having a microcontroller such as a smart card, said portable article being connected by a bus system to said host station, the method being characterized in that it includes a step whereby the host station communicates a specific request to the portable article having a microcontroller.

Advantageously, the bus system is a universal serial bus (USB) system and the specific request is communicated to the portable article having a microcontroller using the control transfer mode of said system; the specific request is a specific request that provides the functionality of a reader for the portable article having a microcontroller; the microcontroller includes an assembly associating a central processor unit with a volatile memory, and the specific request is a DoReset( ) request which triggers resetting of the volatile memory of said assembly; the specific request is a GetATR( ) request which enables an answer string to be recovered on resetting the portable article; the specific request is a SendADPU( ) request which enables the host station to send a command header to the portable article; the specific request is a specific GetData( ) request which enables the host station to recover data sent by the portable article and to recover a status word; the specific request is a SendData( ) request which enables the host station to communicate data to the portable article; the specific request is an IsReady( ) request which serves to prevent the host station triggering a low power consumption mode of operation in the portable article; the portable article sends an OS-STATUS answer to the host station in response to the request enabling said station to trigger a low power consumption mode in said portable article, said response being encoded in such a manner as to define a current status of the portable article; the current status of the portable article is a mute status or a status in which the card is currently processing; the portable article having a microcontroller is a microcontroller card; and the microcontroller of the card includes a non-volatile memory which contains an operating system suitable for communicating by means of a protocol that implements APDU commands such as those defined in the ISO 7816 standard.

In a second aspect, the invention solves this problem by providing a portable article with a microcontroller such as a smart card, the article being suitable for communicating with a host station such as a personal computer by means of a bus which is connected both to said portable article and to said host station, the article being characterized in that it is suitable for communicating directly with the host station.

Advantageously, the portable article is constituted by a smart card; the bus system is a USB bus system; and the portable article includes an assembly associating a central processor unit with a non-volatile memory carrying an operating system suitable for managing APDU commands such as those defined in the ISO 7816 standard.

The invention will be better understood on reading the following non-limiting description. The description should be read with reference to the accompanying drawings.

DETAILED DESCRIPTION

The invention applies in particular in the context of making a host station secure, e.g. a station provided with an operating system as distributed by Microsoft under the name Windows 2000 which is protected as a trademark. That operating system and certain software applications designed to operate with that operating system provide for the use of a card that is intended specifically to make data transfers secure, e.g. to sign email, and to make access to computer networks secure, e.g. by means of authentication algorithms or non-repudiation algorithms. In general, the invention can be implemented on any card having an operating system compatible with the third and fourth parts of ISO standard 7816.

Figure 1:
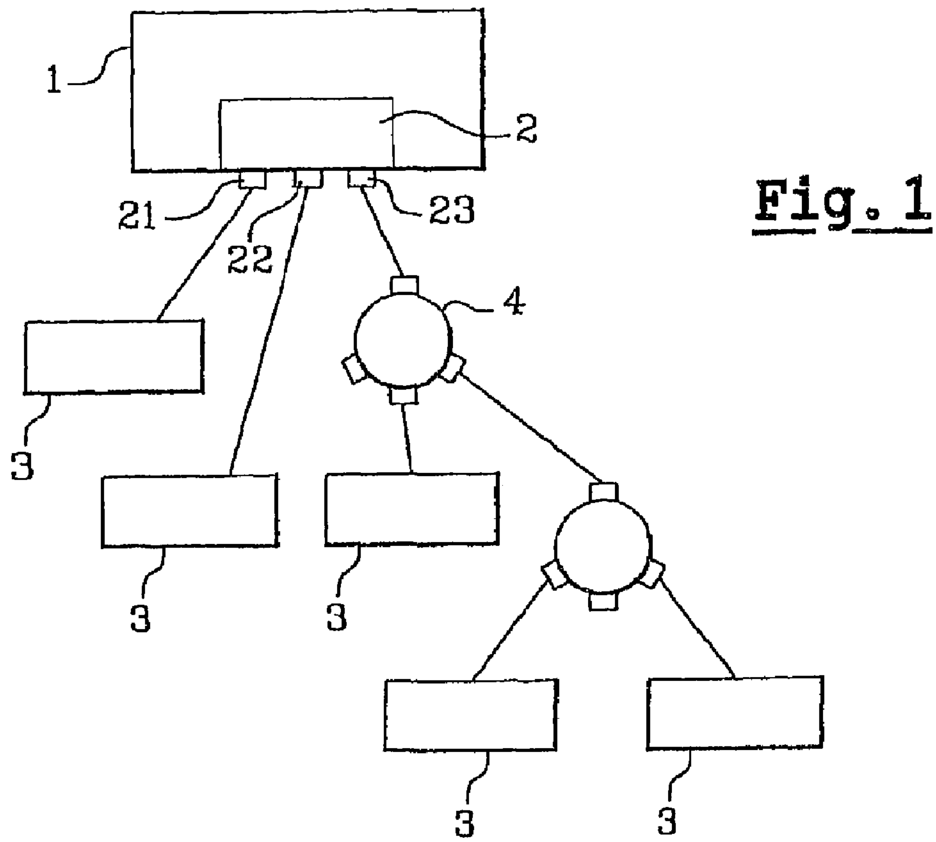
FIG. 1 shows possible connection schemes between a host workstation and a portable article of the invention.

FIG. 1 shows a host station 1 having an integrated hub 2, said hub 2 being provided with specific ports 21, 22, and 23 as defined by Version 1.1 of the USB standard as published on Sep. 23, 1998. The USB ports can be connected to a portable article 3 having a microcontroller in accordance with the invention, either directly, as is the case for articles connected to ports 21 and 22, or indirectly via another hub 4, as is the case for articles connected to port 23.

Figure 2:
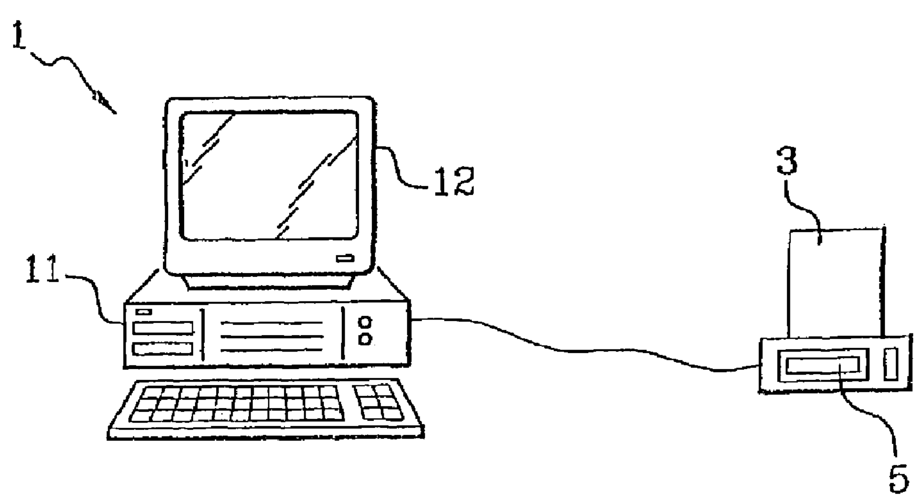
FIG. 2 shows a connection between a host personal computer and a smart card of the invention.

As shown in FIG. 2, the host station is, for example, a workstation formed by a personal computer 1 and the portable article having a microcontroller is a smart card 3. The smart card 3 is connected to a connector 5 which is not a reader, where a reader would have active means for reading and/or writing a card and/or for enabling such writing and/or reading.

In conventional manner, the computer 1 has a central unit 11 connected to a monitor 12 and a keyboard. The central unit 11 includes a motherboard. The motherboard includes, in particular, a microprocessor, and strips of volatile memory. It is connected to a hard disk which constitutes a mass memory for the computer, and also to at least one USB port which is included in a hub integrated in the computer.

Figure 6:
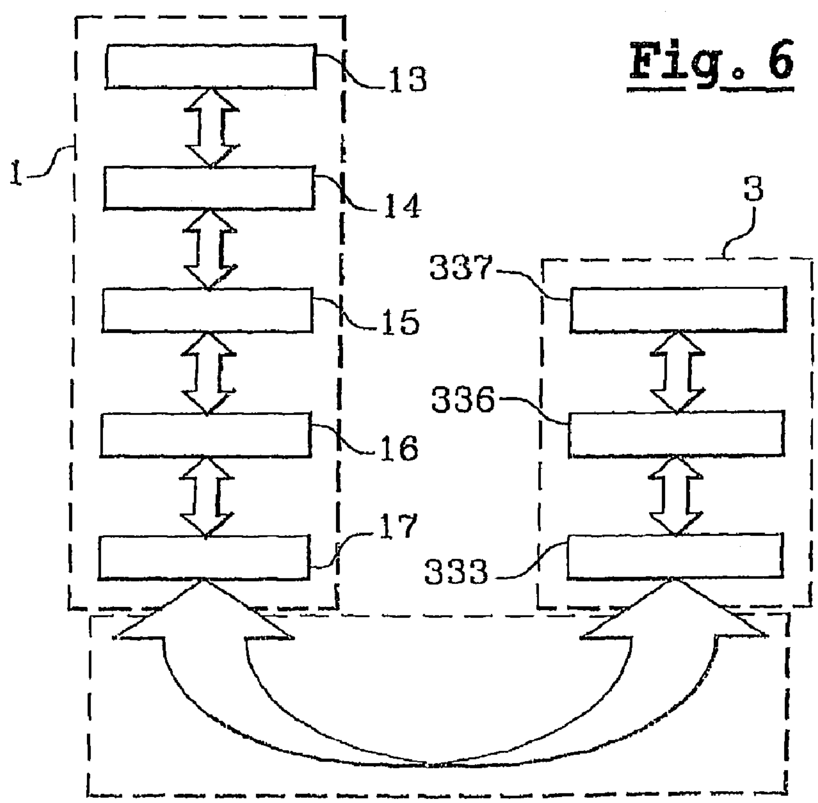
FIG. 6 is a diagram showing logic architecture for a system in accordance with the invention for communication between a card and a software application of a host computer.

With reference now to FIG. 6, it can be seen that the host computer 1 includes at least one software application 13 and makes use of a smart card. It also has a software portion PC/SC 14 which manages the interface used by the application. It also has an intermediate software driver 15 made up of two main logical portions (not shown in FIG. 6). The first portion is loaded into the read/write memory of the host computer on booting and provides an interface with the PC/SC software portion 14, simulating the presence of a reader for one or more smart cards of the invention connected to the host computer. This is a virtual reader. The second portion is stored in the mass memory of the host computer and is loaded into its read/write memory when a card is indeed connected to the host computer, addressed, and configured. This second portion serves to convey information from the PC/SC portion or from the card to respective destinations and it performs data conversion. It also includes a controller portion of the host 16 which serves to manage data distribution over the USB bus. Finally, it has a hardware portion 17 which constitutes the interface between the host and the outside world.

The card 3 shown in FIG. 2 is constituted, for example, by a standard ISO format card or by a card of the "plug-in" format as described in said ISO standard 7816 or in ETSI GSM standard 11.11. Such a card is shown in greater detail in FIG. 3. It comprises a plastics card body 31 having an electronic module inserted therein comprising a microcontroller connected via connection wires to contact areas 32 that are flush with the surface of said card body.

Figure 4:
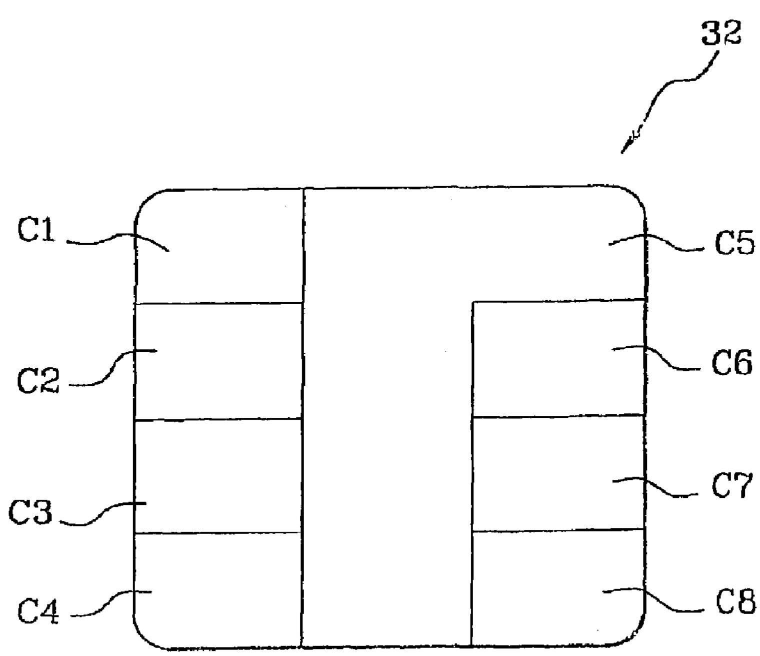
FIG. 4 is an enlarged front view showing the contacts of a smart card for connection in accordance with the invention to a host computer.

FIG. 4 shows the contact areas 32 of the card 3. By way of example there are eight of them. These areas are referenced C1, C2, C3, C4, C5, C6, C7, and C8. The areas C1 and C5 are respectively connected to Vcc and GND pads of the microcontroller of the card and they serve to power the microcontroller. Areas C4 and C8 are respectively connected to pads D+ and D− of said microcontroller, which pads constitute a differential pair for transmitting data using the USB bus system. The other areas are used for transmitting data using the ISO standard and are not made use of in the above-mentioned USB bus system.

Figure 5:
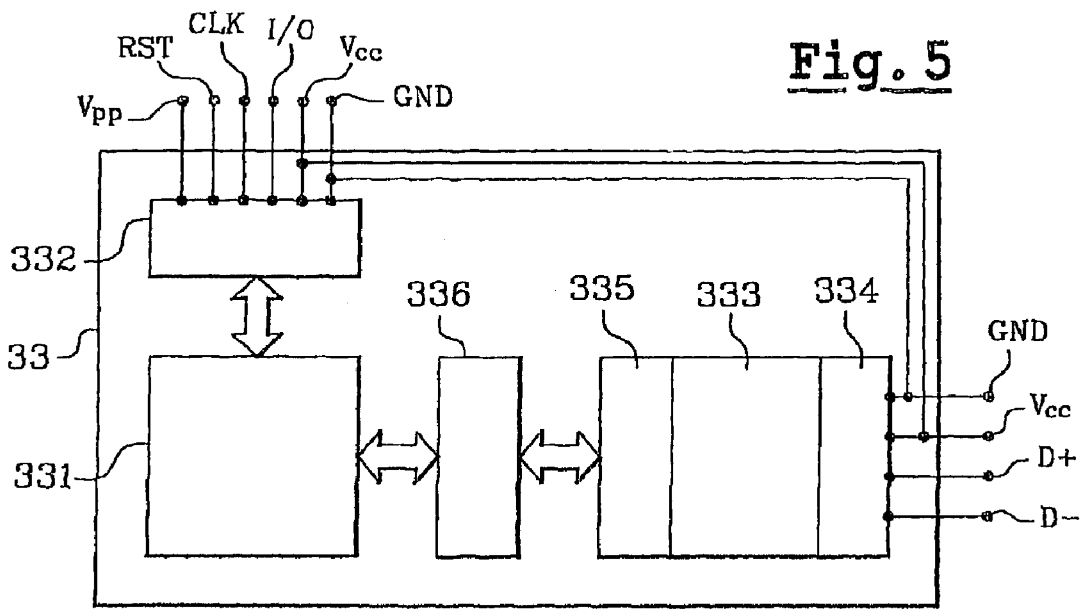
FIG. 5 is a block diagram showing various elements that are involved in the operation of a microcontroller of a card for connection in accordance with the invention to a host computer.

The microcontroller 33 of the card 3 is shown diagrammatically in FIG. 5. It includes an assembly 331 combining a central processor unit CPU with volatile read/write memory RAM, and non-volatile ROM and EEPROM memory, where the ROM carries the operating system of the card. It also has a communications interface 332 that applies the ISO system, a USB engine 333 which is associated firstly with a transmission system 334 and secondly with registers 335, and an external block interface (EBI) 336. The transmission system is connected at least to the D+ and D− areas of the card. It is also connected to the Vcc and GND areas for power supply purposes. The operating system 337 of the card, the EBI 336, and the USB engine 333 are shown diagrammatically in FIG. 6.

Figure 3:
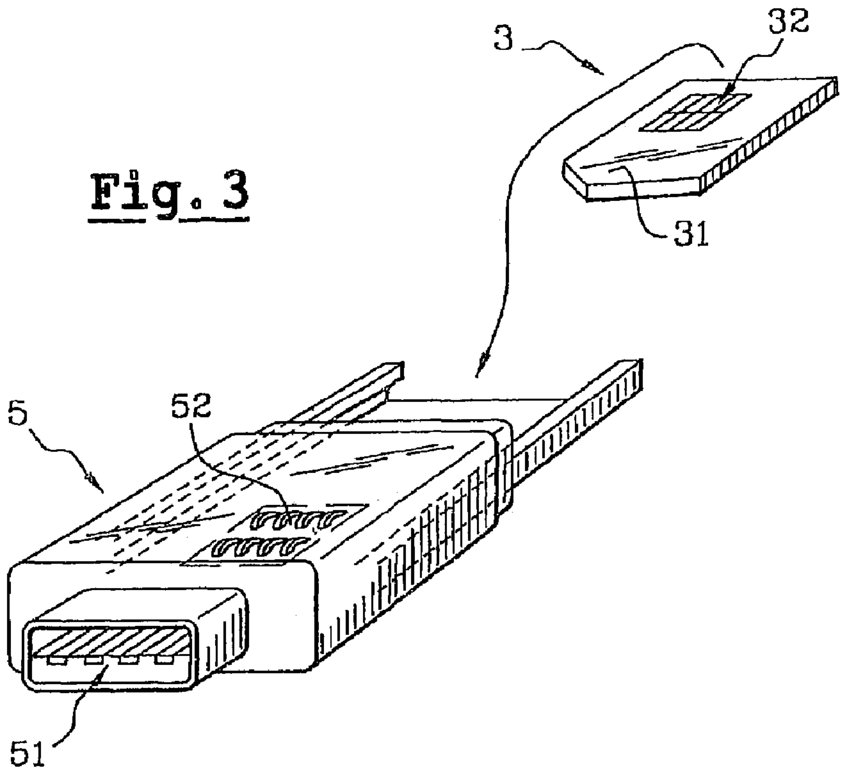
FIG. 3 is a perspective view of a connector element suitable for receiving a smart card for connection in accordance with the invention with a host computer.

As can be seen in FIG. 3, the card is in practice inserted in a card connector 5. In the invention, the connector 5 is small. It possesses no more than a USB connector 51 and a connector 52 for the card 3.

In the USB standard, data can be transferred at two speeds, full speed allowing a data rate of 12 Mb/s and low speed allowing a data rate of 1.5 Mb/s. In the invention, the data is transferred at low speed. It is thus possible to generate an internal clock signal on the basis of the data lines of the USB bus. As a result, the connector 5 does not have any means for supplying a clock signal to the card 3.

In the USB standard, four data transfer modes are provided. Bulk transfer mode and isochronous transfer mode are intended solely for implementation with full speed communication. Control transfer mode and interrupt transfer mode are intended for implementation both in low speed communication and in full speed communication.

In the invention, the card constitutes a USB peripheral that communicates directly with the host computer in control transfer mode. The card can thus interpret and process data which is addressed to it in the form of low speed USB signals over the USB bus. It also has a program enabling it to process USB requests specific to control transfer mode and in particular conventional requests that enable the host computer to recover the descriptors of the card, to give it an address, and to configure it. In the USB standard, control transfer mode is requested for all USB peripherals in order to recover their descriptors, in order to allocate addresses to them, and in order to configure them. The USB standard does not suggest using control transfer mode for handling data transfers other than during control steps of the above-described type.

In addition to conventional USB requests making it possible to recognize, address, and configure the peripheral, six vendor-specific requests have been defined. The card has means for recognizing and processing these vendor-specific requests. These vendor-specific requests make it possible to reproduce the operation of an ISO 7816-3 or ISO 7816-4 card associated with an active smart card reader, while using the USB protocol and the associated data bus and without using an additional interface constituted by the reader. These requests serve in particular to ensure that APDU commands are processed and to initialize or reinitialize the microcontroller of the card without reinitializing the communications interface with the host computer.

The card is controlled firstly by the driver installed in the host computer which is responsible for sending vendor-specific requests, and secondly by the USB engine contained in the microcontroller of the card and its operating system, both of which are responsible for recognizing and processing those requests.

Finally, the card operates "as if" it were connected to a smart card reader, but while using USB protocol, which means that the change of interface, i.e. the change from an ISO smart card reader to a USB connector, is transparent for the application level of the host computer.

The vendor-specific requests of the invention are defined in the table below. In the table:

The values given in the column bmRequest identify the characteristics of the requests. If the value of the bmRequest is 40h, then the request is a vendor-specific request whose data phase is transmitted from the host tot the card. If the value of the bmRequest is C0h, then the request is a vendor-specific request whose data phase is transmitted from the card to the host.

The values given in the bRequest column enable the USB engine to identify the requests DoReset( ) and IsReady( ) while testing only one bit on each occasion, the bits 4 and 5 if the least significant bit is referred to as bit 0.

The values given in the column wValue are specific to the request.

The same applies to the values given in the column wIndex.

The values given in the column wLength specify the number of bytes in the data phase of the request.

The mode given in the last column of the table corresponds to the USB data travel direction. OUT means that during the data phase data travels from the host computer towards the card, while IN means that the data travels from the card to the host computer.

| Request | bmRequest | bRequest | wValue | wIndex | wLength | Mode |
|---|---|---|---|---|---|---|
| DoReset( ) | 40h | 90h | 0000h | 0000h | 0000h | OUT |
| GetATR( ) | C0h | 83h | 0000h | 0000h | Lgth | IN |
| GetData( ) | C0h | 81h | 0000h | 0000h | Lgth | IN |
| IsReady( ) | C0h | A0h | 0000h | 0000h | 0100h | IN |
| SendAPDU( ) | 40h | 80h | 0000h | 0000h | 0500h | OUT |
| SendData( ) | 40h | 82h | 0000h | 0000h | Lqth | OUT |

Initially, two requests are dedicated to the card reset sequence. These are the requests DoReset( ) and GetATR( ).

The request DoReset( ) serves to reset the microcontroller and the read/write memory RAM of the assembly 331 without resetting the communication interface with the host computer. It is processed entirely by the USB engine 333 contained in the microcontroller and it requires no intervention by the operating system of the card. The automatic processing of the vendor-specific request DoReset( ) enables the smart card itself to generate the reset signal, and in association with the vendor-specific request GetATR( ), to conserve normal operation of the reset signal in ISO mode.

The request GetATR( ) serves to recover the answer string to the card reset (where ATR stands for Answer To Reset). This answer is defined in ISO standard 7816-3. It identifies the card.

It will be observed that most peripherals have a reset which is used in the event of abnormal operation. The USB protocol provides for such circumstances by giving the host computer the possibility of sending a USB warm reset which causes the peripheral to be completely reinitialized. Nevertheless, applications relying on the use of smart cards can use smart card reset for the purpose of reinitializing only the read/write memory that is governed by the microcontroller of said card. Under such circumstances, there is no need to reset the communication interface with the host computer and that would be a waste of time. There is therefore no justification in using the USB warm reset signal. Furthermore, this reset signal must be fully asynchronous, which means that it can be taken into account regardless of the state of the card or of the command being processed, if any command is being processed, which is another reason for using smart card readers in those solutions which are presently available in the prior art, where it is the reader that resets the microcontroller and its associated memory by means of the contact area connected to the Reset contact pad of the microcontroller.

Thereafter, four requests are dedicated to processing APDU commands. Three of these requests are SendADPU( ), GetData( ), and SendData( ).

The SendAPDU( ) request serves to send the header of an ISO APDU command to the card, i.e. the portions CLAss, INStruction, parameter P1, parameter P2, and parameter P3.

The request GetData( ) serves both to recover the data sent by the card in the context of a type 2 ISO command and to recover the status word defined by ISO standard 7816, which informs the outside world of the outcome of the previously sent command when execution of the command has terminated.

The request SendData( ) serves to send data in addition to the header parameters of the command in the context of a type 3 ISO command.

Finally, the fourth request is a request which is used to prevent triggering low power consumption mode and to handle the sequencing of APDU commands. This is the request IsReady( ). Semiautomatic processing of the vendor-specific request IsReady( ) serves to avoid switching to low power consumption while executing an APDU ISO command. The time required by the card to process an APDU ISO command cannot be foreseen. Unfortunately, the USB protocol provides for a low power consumption mode when the bus has not been in use for a certain length of time, and this can happen if the time taken to process an APDU ISO command is too long. This request thus prevents switching over into low power consumption mode while processing an APDU ISO command, while nevertheless making such a switchover possible in other cases. More precisely, it makes it possible to recover the state of the operating system of the card or of the command that is being processed if a command is indeed being processed. It is sent periodically, e.g. once every 5 milliseconds (ms) by the driver 15 contained in the host computer while the card is processing an APDU ISO command. It can be processed by the USB engine 333 contained in the microcontroller. This applies in particular when the microcontroller is busy or mute and therefore cannot reply. It can also be processed by the operating system of the card, in particular when it is available and can therefore respond.

This set of vendor-specific requests makes it possible to reconstitute the behavior of a smart card reader associated with the card in addition to performing conventional smart card operations in ISO mode and performing standard USB peripheral operation.

Furthermore, an OS_STATUS response to the IsReady( ) request has also been defined. This response is encoded on one byte having its first four bits defining the current state of the card and its last four bits specifying said state.

Thus, when bit 7 is 1, that means that the card is in a mute state referred to as MUTE. When bit 6 is 1, that means the operating system of the card is processing and consequently that the system is not available for any other processing. The card is then said to be in a BUSY state. When bit 5 is 1, that means that processing of the command previously received by the card has terminated and that the operating system is ready to send a status word SW1 SW2. The card is then said to be in a status word phase (SWP). When bit 4 is 1, that means that the operating system of the card is ready to send or receive data relating to an earlier command. The card is then said to be in a data transfer phase (DTP) state.

The bits 3, 2, 1 and 0 provide further information about the current state. They can be useful, for example, when a command is very long, so as to avoid causing a time-out, i.e. taking action because a command has exceeded some maximum specified time. Under such circumstances, its value is incremented cyclically. It therefore returns to 0h after its value was Fh, thereby enabling the driver contained in the PC to detect some activity.

Pure encapsulation of the communication protocol defined in parts 3 and 4 of ISO standard 7816 by means of the USB protocol would give rise to a loss of time associated with the facts that the card can transmit information over the USB bus only when requested to do so by the host computer and that some of the information is not of any use in the context of executing an APDU command. The use of the vendor-specific request IsReady( ) enables this length of time to be reduced by informing the card driver not only of the current state of the card, but also of the current state of the command, thereby making it possible to eliminate the procedure byte step defined in ISO standard 7816-3.

ISO standard 7816-3 provides for time-out management if the operating system of the card does not return data within a length of time defined by the ATR string. For commands that cannot be processed within this time, the standard also provides for the byte 60h to be used which constitutes a reserved value for specifying that the card is still processing. When the card sends this byte it has the effect of reinitializing the counter for triggering the time-out. Management of this time-out can be reproduced by means of the value returned in response to the IsReady( ) request.

Figure 7:
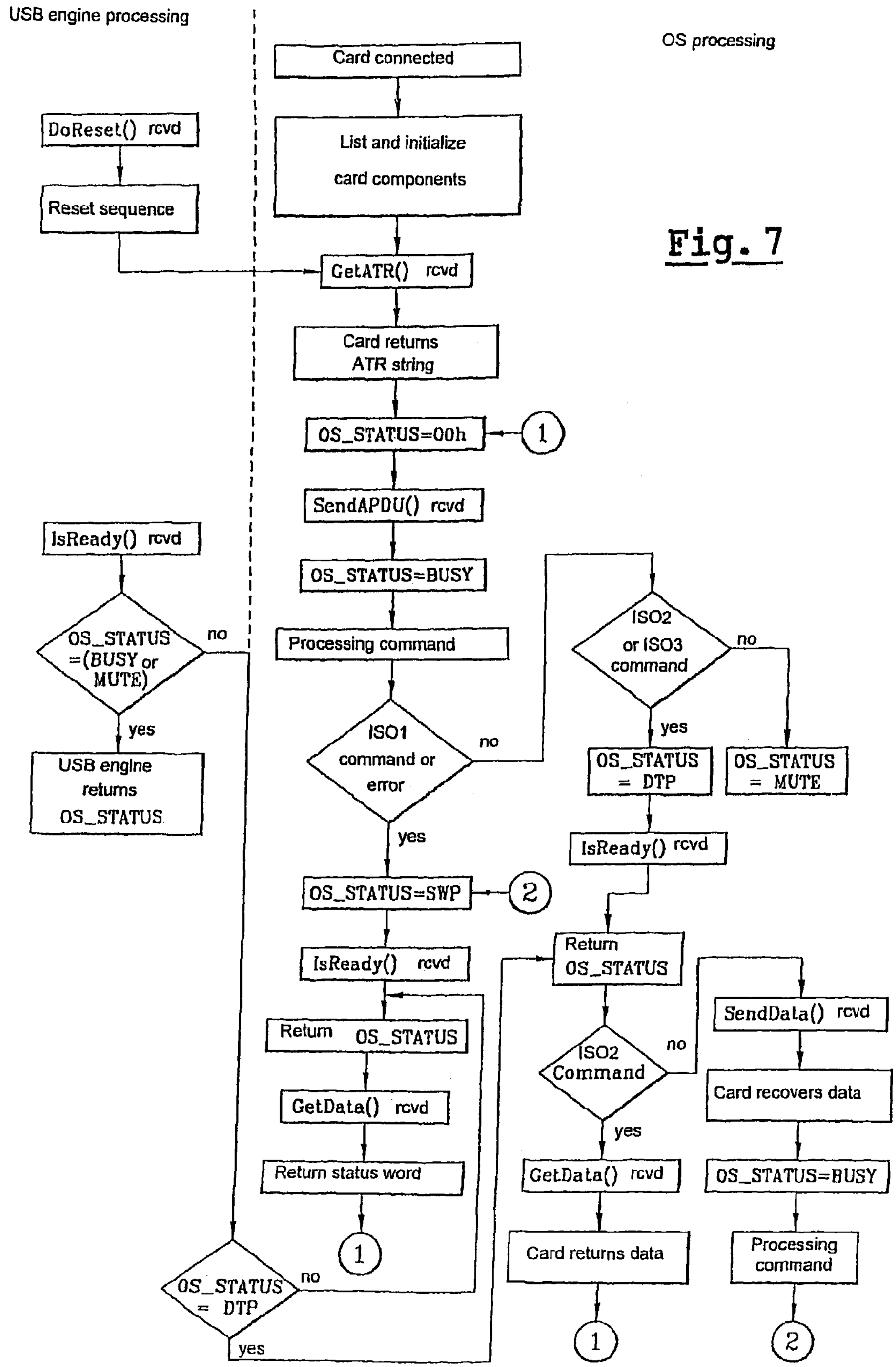
FIG. 7 is a flow chart showing how a communication session takes place with a smart card of the invention.

FIG. 7 shows how a communications session takes place with a smart card of the invention. On the left, this figure shows the processing performed by the USB engine of the card, and on the right it shows the processing performed by the operating system of the card.

The processing performed by the operating system of the card comprises the following processing in particular.

"Card connected" to a USB port of the host computer. The host computer is then informed that the card is connected, and that it constitutes a new USB peripheral. The computer then powers the card having the effect of resetting it. This reset comprises resetting the card RAM, the EBI 336, the registers 335, and the transmission system 334.

"List and initialize card components". Listing is a USB operation which enables the card to be made operational, i.e. addressed and configured. Once the card has been reset by the previous processing, it can identify itself to the host computer. It is during the listing stage that the card sends various pieces of information to the host computer in the form of descriptors. The host computer then gives an address to the card and configures it. The card then appears as being ready for use.

"GetATR( ) received". After the previous step of listing and initializing, the card waits for a vendor-specific request GetATR( ). This is the only vendor-specific request that is authorized at this stage.

"Card returns ATR string". Once the vendor-specific request GetATR( ) has been received, the card returns the ATR string. Thus, at application level in the host computer, the Reset that exists in cards that are compatible solely with ISO standard 7816 is simulated.

"OS_STATUS=00h". The card operating system takes up a configuration in which it is ready to process an APDU ISO command by setting its status byte to 00h.

"SendAPDU( ) received". The card operating system receives the header of an APDU command in the form of a vendor-specific USB request.

"OS_STATUS=BUSY". The card operating system prepares itself to process the header of the APDU command and thus becomes unavailable. To inform the outside world that it is not available, and in practice to inform the host computer, said operating system updates its status byte by setting it to "BUSY". At this stage, requests coming from the host computer are processed by the USB engine of the card.

"Processing command". The operating system of the card is processing the header of the APDU command.

At this stage, several situations can arise.

Firstly, the command is an ISO APDU command of type 1, i.e. an APDU command represented solely by its header and whose execution gives rise to the card sending a status word, or else a type 2 or 3 ISO command in error, a type 2 ISO command being a command defined by its header and whose execution gives rise to data being sent together with a status word by the card, and an ISO type 3 command being a command defined by its header and by data, and whose execution gives rise to the card sending a status word. In this case, the following cases are implemented.

"OS_STATUS=SWP". The card operating system is ready to return the status word, which is again available for processing requests sent thereto, and is waiting for an IsReady( ) request to inform the host computer. This status byte is thus updated. It takes the value "SWP".

"IsReady( ) received". The operating system of the card then receives the vendor-specific request IsReady( ). The role of this request is to inform the outside world of the state of the operating system of the card which is "MUTE" or "BUSY", or else, the state of the APDU ISO command being processed which is "SWP" or "DTP". In the present case, the response to this request is "SWP". It informs the host computer that it must send a GetData( ) command in order to recover the status word.

"Return OS_STATUS". The operating system of the card returns its status byte to the host computer and waits for a vendor-specific request GetData( ).

"GetData( ) received". After the vendor-specific request has been sent to it, the card operating system receives the GetData( ) request for the purpose of enabling the computer to recover data returned by the card operating system, such as the status word in the present case.

"Return status word". In response to the GetData( ) request, the operating system of the card returns the status word. It then takes up a configuration in which it is ready to process a new APDU ISO command and the system then returns to the previously described step "OS_STATUS=00h".

ISO APDU commands of types 2 and 3 have the special feature of possessing a data phase, from the card to the host for ISO 2 commands and from the host to the card for ISO 3 commands. In both cases, the operating system must inform the host computer that it is ready for the data phase. The following steps are then implemented.

"OS_STATUS=DTP". The card operating system is ready for the data phase of the ADPU ISO command. It is thus available again for processing the requests which are sent to it and it is waiting to receive an IsReady( ) request to inform the outside world of this state of availability. The status byte is therefore updated. It takes the value "DTP".

"IsReady( ) received". The card operating system receives a vendor-specific request IsReady( ). The purpose of this request is to inform the host computer of the status of the operating system of the card which is "MUTE" or "BUSY", or else the status of the APDU ISO command presently being processed which is "SWP" or "DTP". In the present case, the response to this request is "DTP". Initially, this response informs the host computer that it must send a GetData(P3) request to recover the data constituting the response to the APDU ISO command. This data then comprises P3 bytes, where P3 is one of the parameters of the APDU ISO command. In a second case, the response informs the host computer that it is must send a SendData (P3) request to send the additional data of the APDU ISO command. This data then comprises P3 bytes, where P3 is one of the parameters of the APDU ISO command.

"Return OS_STATUS". The card operating system returns its status byte to the host computer and expects either a GetData(P3) request or a SendData(P3) request.

Two situations can then arise.

The first situation is that of an ISO2 APDU command for the nominal case where no error relating to the header of the command or in the current context of the card has been detected. The operating system of the card then expects a GetData(P3) request.

"GetData( ) received". The card operating system has received the GetData( ) request. The function of this request is to recover data returned by the operating system, such as, in the present case, the data constituting the response to the APDU ISO command of type 2.

"Card returns data". Once the GetData( ) request has been received, the card returns the data constituting the response to the APDU ISO command and puts itself into a configuration in which it is ready to return the status word, in which case the system returns to above-mentioned step "OS_STATUS=SWP".

The second circumstance is that of an APDU ISO command of type 3 in the nominal case where no error has been detected in the header of the command or in the current context of the card. The operating system then expects a SendData(P3) request.

"SendData( ) received". The card operating system has received the SendData( ) request. This request enables additional data to be sent as is required to operate the APDU ISO command of type 3.

"Card recovers data". Once the request has been received, the card recovers the additional data of the APDU ISO command of type 3 and puts itself in a configuration that enables it to process the remainder of the data of the command.

"OS_STATUS=BUSY". Since the operating system of the card is processing, it is no longer capable of processing any requests that might be sent to it. It indicates this status by setting its status byte to "BUSY". During this stage, it is the USB engine of the card which processes requests sent by the host computer.

"Processing the command". The operating system terminates processing of the APDU ISO command and puts itself into a configuration in which it is ready to return the status word. It then returns to the above-described step "OS_STATUS=SWP".

The last circumstance processed by the operating system of the card is that of a severe error occurring during execution of any APDU ISO command, e.g. following a security attack or corruption of data. Under such circumstances, the operating system of the card is set to mute in the following step.

"OS_STATUS=MUTE". The card operating system updates its status byte to "MUTE" to inform the host computer that it is unavailable until the next DoReset( ) request or until the card has been disconnected. During this stage, it is the USB engine which processes the requests sent by the host computer.

The processing performed by the USB engine includes the following processing in particular.

While the operating system (OS) is unavailable, i.e. while OS_STATUS=BUSY or OS_STATUS=MUTE, requests sent by the host computer are processed by the USB engine. Furthermore, the request DoReset( ) is always processed by the USB engine so as to avoid any intervention of the card operating system in its own resetting.

Three circumstances can thus arise. The first circumstance, which does not appear in FIG. 7, corresponds to all of the requests which are not stated as being processed by the USB engine. For these requests, the USB engine does no more than inform the host computer that they are out of context.

The second circumstance is that of the DoReset( ) request and the following steps are performed.

"DoReset( ) received". Whatever the status of the card operating system or of the APDU ISO command currently being processed, this request is always processed by the USB engine. It causes the CPU of the card and its associated memory to be reset, and only the central unit and the memory associated with it are reset since the USB communication interface formed by the configuration and the address of the peripheral remain intact.

"Reset sequence". The CPU of the card and its memory are reinitialized. The operating system of the card expects a GetATR( ) request. The reset sequence puts the operating system of the card into a state that enables it to process requests that are sent thereto.

The third circumstance is that of the IsReady( ) request occurring while the card operating system is unavailable. The following steps are then performed.

"IsReady( ) received". The operating system of the card receives the IsReady( ) request. The function of this request is to inform the host computer of the "MUTE" or "BUSY" status of the card operating system, or of the "SWP" or "DTP" status of the APDU ISO command being processed. The operating system of the card is unavailable, being "MUTE" or "BUSY". The other circumstances are processed by the operating system of the card.

"USB engine returns OS_STATUS". The USB engine informs the host computer of the card operating system status by returning its status byte.

In this way, the operation of an ISO card associated with its smart card reader is reproduced.

Now that FIG. 7 has been described, the description below constitutes an explanation of FIGS. 8A and 8B, 9A to 9D, and 10A to 10D.

Figure 8A:
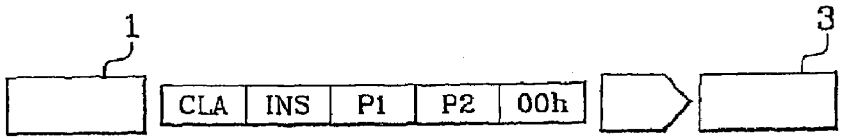
FIGS. 8A and 8B show transactions which take place in a mode for executing an ISO type 1 command by the card.
Figure 8B:
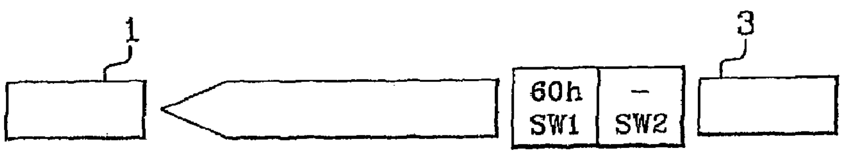

For a type 1 APDU command as shown in FIG. 8A, the command header suffices to execute the command in full and the only response from the card operating system is the status word. Thus, in the ISO protocol, communication is split into at least two steps. In a first step, the computer sends the command header. Then, in a second step, the card sends a byte 60h to reset the counter for determining the time-out or else a status word SW1 SW2 (FIG. 8B). When the byte 60h is sent, subsequent steps consist in sending other bytes, possibly 60h, with the last step always being sending a status word SW1 SW2. In contrast, in the invention, the steps shown in FIG. 8B is eliminated. It is replaced by the response of the card to an IsReady( ) command sent by the host computer.

Figure 9A:
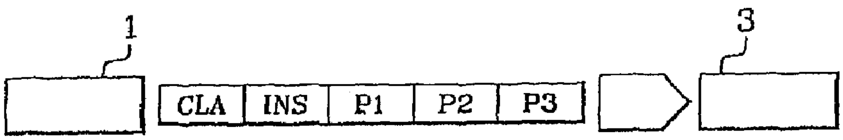
FIGS. 9A to 9D show the transactions which take place in a mode for executing ISO type 2 commands by the card.
Figure 9B:
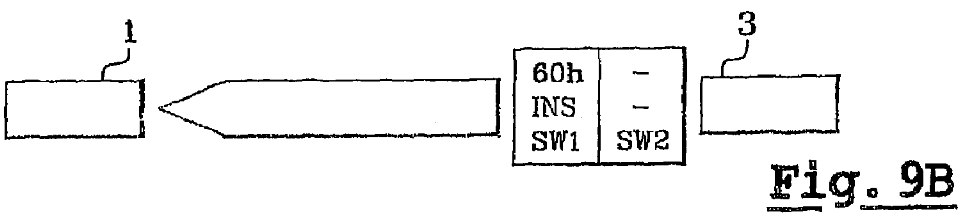
Figure 9C:
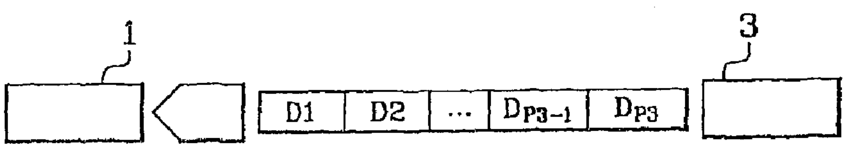
Figure 9D:
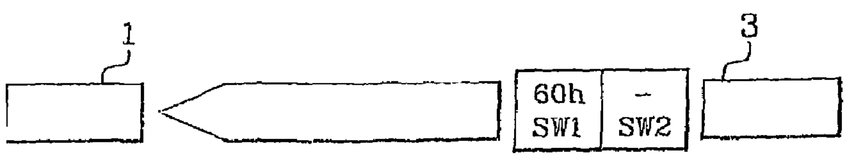
Figure 10A:
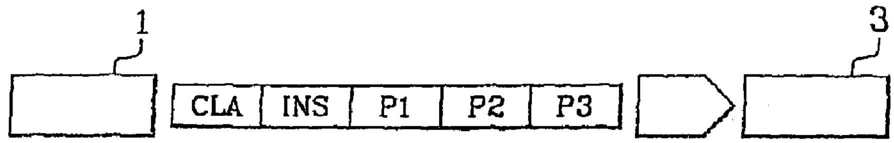
FIGS. 10A to 10D show the transactions which take place in a mode for executing an ISO type 3 command by the card.
Figure 10B:
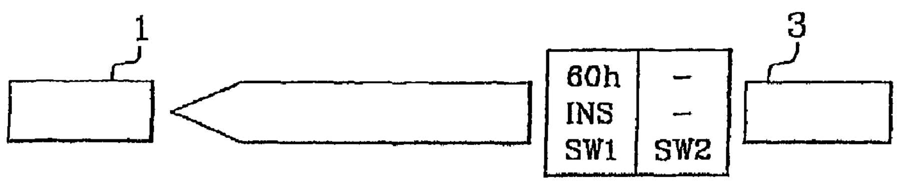
Figure 10C:
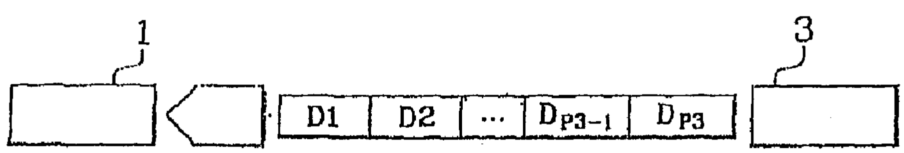
Figure 10D:
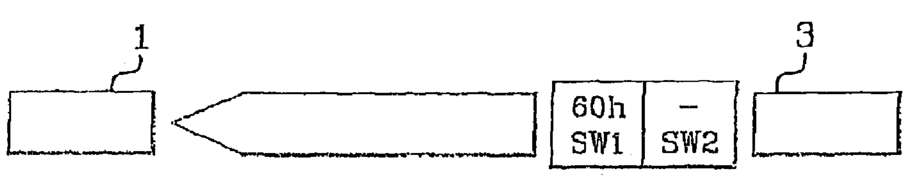

For a type 2 ISO APDU command, the command header begins execution but the response of the card operating system is made up of data in addition to the status word. Communication is generally split into four steps. In a first step as shown in FIG. 9A, the computer sends the command header. The second step is conventionally used in an ISO procedure. In this step, the computer receives the procedure byte 60h, INS, or SW1. When the procedure byte is 60h, the system returns to the circumstance described above until it receives the INS byte or the SW1 byte. Once the INS or SW1 procedure byte has been received as shown in FIG. 9B, then the process continues as described below with reference to FIGS. 9C and 9D. Nevertheless, it should be observed that in the invention the step of FIG. 9B is omitted. It is replaced by the response of the card to an IsReady( ) command sent by the host computer. With reference now to FIG. 9C, which corresponds to the received procedure byte being INS, the card sends data. Finally, the computer waits for the procedure byte until it becomes SW1 as shown in FIG. 9D. If INS is not received but SW1 is received directly, then SW2 is received and the command is terminated. In the invention, the steps shown in FIGS. 9C and 9D are conserved except for the circumstance shown in FIG. 9D in which the card returns the procedure byte 60h.

For a type 3 APDU command, the procedure is identical to the procedure described above with reference to processing a type 2 ISO command except for the direction in which data is sent which is no longer from the card to the computer but from the computer to the card.

In summary, a card-like portable article having a microcontroller has been described. The card-like portable article comprises a memory that contains a set of instructions allowing the microcontroller to communicate in accordance with a first communication protocol. The card-like portable article further comprises an interface for converting commands in accordance with the first communication protocol into commands in accordance with a second communication protocol and vice versa. Preferably, the first communication protocol is in conformity with the ISO 7816-3 standard and the second communication protocol is in conformity with the USB standard. An advantage is that the card-like portable article does not require a specific operating system in order to communicate in accordance with the USB standard. An ISO 7816 based operating system can be used. Such an operating system can be implemented at relatively low cost whereas a specific operating system for USB entails relatively high development costs.

Also has been described a connector having an end that constitutes a slot for receiving a card-like portable article and another end that constitutes a plug that is insertable in a USB slot of a host station. Preferably, the slot comprises a set of contact elements that, when an ISO 7816 compatible card-like portable object is inserted in the slot, are in contact with contact area C1, C5, C4 and C8 of the ISO 7816 compatible card-like portable object.

The invention claimed is:

1. A method of communication between a host station and a portable article having a microcontroller, said portable article being in the form of a unitary assembly and being connected by a bus system to said host station, wherein the method includes:

a conversion of data received in accordance with a second communication protocol into data in accordance with a first communication protocol and vice versa, a step whereby the host station communicates a specific request to the portable article having a microcontroller, the specific request being an IsReady( ) request which serves to prevent the host station triggering a low power consumption mode of operation in the portable article, and a step wherein the portable article sends an OS-STATUS answer to the host station in response to the request enabling said station to trigger a low power consumption mode in said portable article, said response being encoded in such a manner as to define a current status of the portable article.

2. The method according to claim 1, wherein the bus system is a universal serial bus USB system and in that the specific request is communicated to the portable article having the microcontroller using the control transfer mode of said system.

3. The method according to claim 1, wherein the current status of the portable article is a mute status or a status in which the card is currently processing.

4. The method according to claim 1, wherein the portable article having a microcontroller is a microcontroller card.

5. The method according to claim 1, wherein the microcontroller of the card includes a non-volatile memory which contains an operating system suitable for communicating by means of a protocol that implements Application Protocol Data Unit ("APDU") commands defined in the ISO 7816 standard.

* * * * *